United States Patent
Farrell et al.

(10) Patent No.: US 6,704,856 B1
(45) Date of Patent: Mar. 9, 2004

(54) METHOD FOR COMPACTING AN INSTRUCTION QUEUE

(75) Inventors: James A. Farrell, Harvard, MA (US); Timothy C. Fischer, Maynard, MA (US); Daniel L. Leibholz, Cambrdige, MA (US); Bruce A. Gieseke, Ashland, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/465,175

(22) Filed: Dec. 17, 1999

(Under 37 CFR 1.47)

Related U.S. Application Data

(60) Provisional application No. 60/118,130, filed on Feb. 1, 1999.

(51) Int. Cl.$^7$ .............................. G06F 9/30; G06F 9/40
(52) U.S. Cl. .................. 712/215; 712/217; 712/218; 712/23
(58) Field of Search .................. 712/216, 217, 712/218, 219, 215, 23

(56) References Cited

U.S. PATENT DOCUMENTS

| | | |
|---|---|---|
| 4,847,755 A | 7/1989 | Morrison et al. |
| 5,155,843 A | 10/1992 | Stamm et al. |
| 5,627,983 A | 5/1997 | Popescu et al. |
| 5,822,559 A | 10/1998 | Narayan et al. |
| 5,870,578 A | 2/1999 | Mahalingaiah et al. |
| 5,872,946 A | 2/1999 | Narayan et al. |
| 6,112,019 A | 8/2000 | Chamdani et al. |
| 6,115,807 A | 9/2000 | Grochowski |
| 6,148,394 A | 11/2000 | Tung et al. |
| 6,182,210 B1 | 1/2001 | Akkary et al. |

OTHER PUBLICATIONS

Popescu, V. et al., "The Metaflow Architecture," *IEEE Micro*, 11(3) :10–13, 63–73 (1991).

(List continued on next page.)

*Primary Examiner*—Richard L. Ellis
*Assistant Examiner*—Tonia L. Meonske

(57) ABSTRACT

A method of compacting an instruction queue in an out of order processor includes determining the number of invalid instructions below and including each row in the queue, by counting invalid bits or validity indicators associated with rows below and up to the current row. For each row, multiplexor select signals are generated from the flat vector counts for the N rows above and including the present row, and from the validity indicators associated with the N rows, where N is a predetermined value. A multiplexor associated with a particular row selects one of the N rows according to the select value, and moves or passes the instruction held in the selected row to the present row. A row's select value is determined by forming a diagonal from the N count vectors corresponding to the N rows above and including the present row, and logically ANDing, each diagonal bit with the valid bit associated with the same row. Each row's count vector is determined in two stages. In the first stage, a local count is determined for each row in a local group of rows, and a global count is determined for the entire local group. Each local count is determined by counting the validity indicators associated with rows in the local group. In the second stage, a final count is determined for each row in the queue, by combining the local and global counts generated for the local group in the first stage, with global counts generated in local groups below the local group. The N rows can extend to the queue's input pipeline.

2 Claims, 12 Drawing Sheets

OTHER PUBLICATIONS

Kessler, R.E., Comaq Computer Corporation, "The Alpha 21264 Microprocessor," *IEEE Micro* 24–36 (Mar.–Apr. 1999).

Liebholz, Daniel and Razdan, Rahul, Digital Equipment Corporation, "The Alpha 21264: A 500 MHZ Out–of–Order Execution Microprocessor," from Compcon Feb., 1997 Proceedings.

Keller, J., "The 21264: A Superscalar Alpha Processor with Out–of–Order Execution," Paper present at the Microprocessor Forum on Oct. 22–23, 1996.

Gieseke, B.A., "A 600MHz Superscalar RICS Microprocessor with Out–of–Order Execution," Paper presented at the IEEE International Solid–State Circuits Conference (Feb. 1997).

Farrell, J.A. and Fischer, T.C., "Issue Logic for a 600–MHz Out–of–Order Execution Miroprocessor," *J. Solid–State Circuits* 33(5) : 707–712 (1998).

Scott, A.P., et al., "Four–Way Superscalar PA–RISC Processors," *J. Hewlett–Packard* 1:1–9 (Aug. 1997).

Farrell, J.A. and Fischer, T.C., "Issue Logic for a 600 MHz Out–of–Order Execution Microprocessor," Symposium on VLSI Circuits Digest of Technical Papers, pp. 11–12 (1997.

Gwennap, L., "Digital 21264 Sets New Standard: Clock Speed, Complexity, Performance Surpass Records, But Still a Year Away," *Microprocessor Report* 10(14) :1–12 (Oct. 28, 1996).

"A Tour of the P6 Microarchitecture" http://eecad.sogang.ac.kr/AboutSite+Others/Others/intel/procs/p6/p6white/p6white.htm. publication date unknown.

"A 56–Entry Instruction Reorder Buffer," http://www.hp.com/ahp/framed/technology/micropro/micropro/pa–8000/docs/56entry.html. publication date unknown.

Fishcher, T. and Leibholz, D., "Design Tradeoffs in Stall–Control Circuits for 600MHz Instruction Queues," Paper presented at the IEEE International Solid–State Circuits Conference (Feb. 1998).

METHOD FOR COMPACTING AN INSTRUCTION QUEUE

RELATED APPLICATION

This application claims the benefit of U.S. Provisional Application No. 60/118,130, filed Feb. 1, 1999, the entire teachings of which are incorporated herein by reference.

BACKGROUND OF THE INVENTION

An instruction queue is typically a random-access storage array which holds instructions between the time they are fetched from memory and when they are issued to an execution unit. The queue is typically structured as a set of rows, each of which holds one instruction.

In many modern microprocessors, instructions issue from the instruction queue out-of-order, with instruction prioritization managed with pointers to the oldest and newest instructions in the queue. The concept of out-of-order execution is also called "dynamic execution" or "dynamic scheduling". The queue structure itself may also be called an "instruction buffer", "re-order buffer", or "scoreboard".

In some CPUs, for example, the instruction queue is called a "Re-order Buffer." There are two buffers, one for ALU instructions and one for memory operations, each containing twenty-eight entries. Instructions remain in a buffer from the time they are fetched until they are retired, and are not removed at issue time. Instructions are inserted into a queue in a round-robin fashion based on the "newest" instruction pointer. Issue arbitration starts at the oldest instruction pointer, looking for the first data-ready instruction. Because instructions remain in the buffer during their life and retire inorder, empty rows are not produced within the buffer.

Other instruction queue architectures, sometimes called re-order buffers, appear to hold twenty-four instructions through similar execute and retirement operations.

Other out-of-order issue machines with a 16-entry or larger re-order buffer track the status of each in-flight instruction, and twelve integer and eight floating-point "rename buffers" assign instructions to execution units. Each execution unit has a "reservation station," that is, an instruction buffer dedicated to an execution unit from which data-ready instructions are issued.

SUMMARY OF THE INVENTION

In each cycle of a computer system encompassing the present invention, any combination of up to four instructions can be issued from the queue, and up to four new instructions can enter the queue. Instructions are removed from the queue two cycles after they are issued, creating empty queue rows. New instructions can enter the queue only when there are a sufficient number of empty rows in which to place the instructions.

While in the queue, instructions are prioritized to prevent deadlock by insuring all instructions are issued from the queue in a finite amount of time, and to meet performance goals by issuing oldest instructions first.

A preferred embodiment of the present invention compacts older instructions toward the bottom of the queue each cycle while maintaining their original order, using an update logic circuit which generates control signals to perform the compaction. This creates room at the top of the queue where new instructions enter. This greatly simplifies the issue prioritization process, allowing the use of fast, simple arbitration circuits.

One system employing the present invention has two instruction queues: an integer queue with twenty entries, or rows, and a floating point queue with fifteen entries. The bottom row is numbered row 0, and the top row is 19 for the integer queue and 14 for the floating-point queue. Operation of the queues is similar, thus attention is focused primarily on the integer queue.

Pointers are not used. Instructions in the queue are ordered, from the bottom to the top, in the relative order in which they entered the queue. Instructions are removed from the queue when they are issued, i.e., sent to functional units for execution.

Because instructions are issued out-of-order, removal of instructions from the queue leaves empty rows, marked as invalid, scattered throughout the queue. The remaining instructions are physically compacted in the queue toward the bottom, i.e., row 0, each cycle. This leaves empty queue rows toward the top of the queue, where they are filled with instructions entering in subsequent cycles. This operation is preferably simplified by moving instructions at most four rows lower each cycle. Since no more than four instructions enter the queue each cycle, maximum input bandwidth is guaranteed.

Instructions are moved through the queue via multiplexors associated with each queue row. Each multiplexor has five data inputs. For row N, these inputs correspond to the contents of rows N through N+4. An instruction in row N+2 is moved to row N by asserting the "N+2" multiplexor select signal for the multiplexor associated with row N. The Update Logic circuit generates each row's multiplexor selects to control the compaction of the queue.

Maintaining instructions in-order from bottom to top of the queue eliminates the use of pointers to track oldest/newest queue instructions. This greatly simplifies the issue prioritization process, allowing the use of fast, simple arbitration circuits.

In a fast computer system, e.g., one having a frequency of 600 MHZ, simplifying the arbitration stage, i.e., the primary critical path in the issue logic, is essential to meet performance goals. Adding an extra stage of logic to the issue signal critical path to prioritize instructions based on pointers would mean running at a much slower cycle time, reducing the performance of the entire machine.

Accordingly, a method of compacting an instruction queue in an out of order processor, comprises determining the number of invalid instructions below and including each row in the queue, by counting invalid bits or validity indicators associated with rows below and up to the current row.

For each row, a select value is determined from the previously determined counts for the N rows above and including the present row, and from the validity indicators associated with the N rows, where N is a predetermined value. A multiplexor associated with a particular row selects one of the N rows according to the select value, and moves or passes the instruction held in the selected row to the present row.

Where a maximum of N new instructions can enter the queue during any given cycle, it is sufficient to limit each count to N.

Preferably, each count is a flat vector, where each position in the vector indicates a different number of valid instructions up to the present row, and in which only one bit is set at any time.

A row's select value is preferably determined by forming a diagonal from the N counts corresponding to the N rows above and including the present row, and logically ANDing, or masking, each diagonal bit with the valid bit associated with the same row.

Preferably, only valid queue instructions are moved.

In a preferred implementation, however, validity indicators must be moved regardless of the validity indicator. Thus, for each row, an additional modified select value is determined, similar to the select value already determined. However, the most significant bit is not masked, and is derived from a modified diagonal. A second multiplexor associated with each row moves a valid bit from a row indicated by the modified select value to the validity indicator storage location associated with the present row.

Preferably, each row's count is determined in two stages. In the first stage, a local count is determined for each row in a local group of rows, and a global count is determined for the entire local group. Each local count is determined by counting the validity indicators associated with rows in the local group. In the second stage, a final count is determined for each row in the queue, by combining the local and global counts generated for the local group in the first stage, with global counts generated in local groups below the local group.

Preferably, the N rows can extend to the queue's input pipeline.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
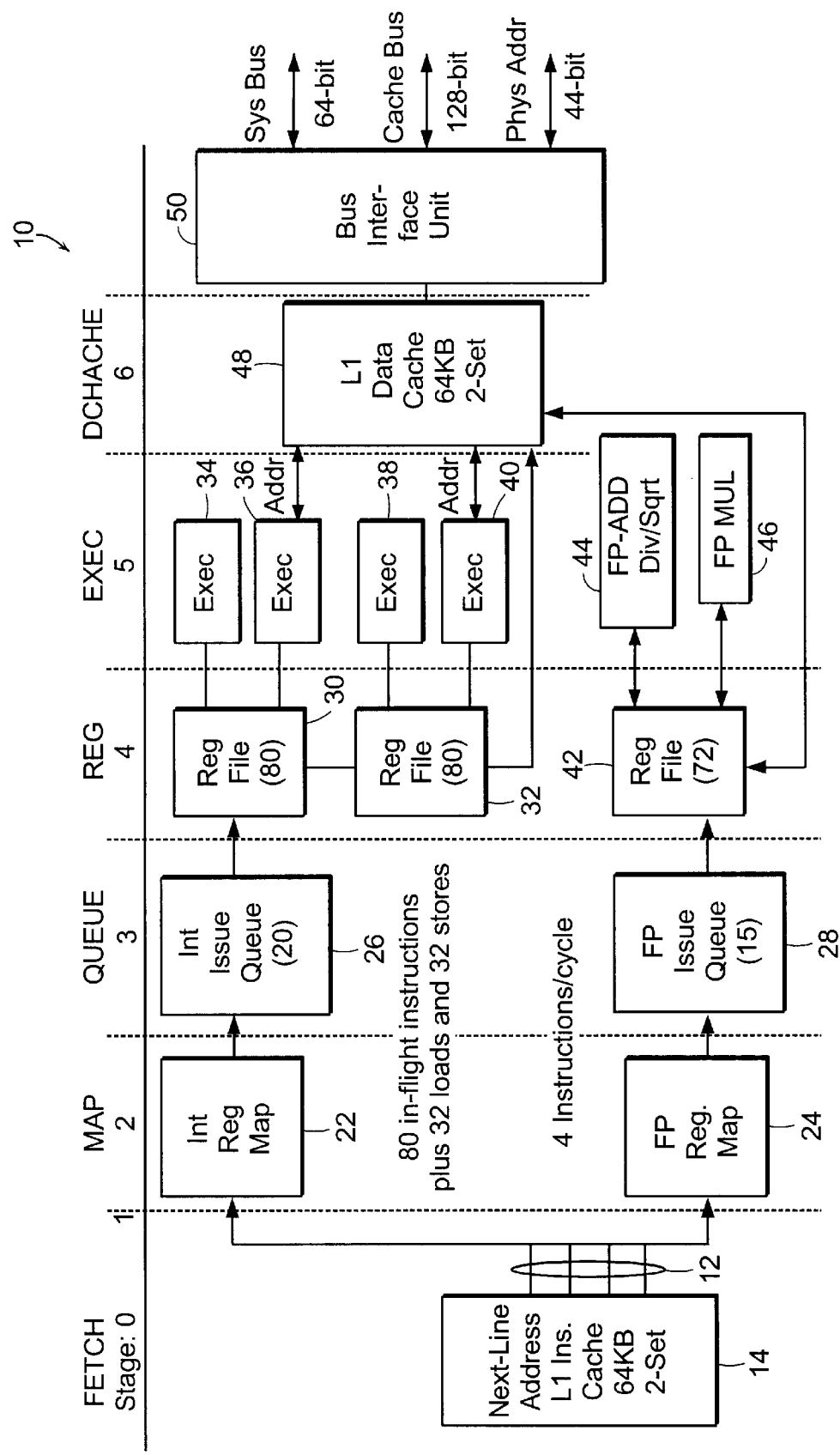
FIG. 1 is a block diagram illustrating the pipeline stages of a CPU to which the present invention is applied.

FIG. 1 is a block diagram illustrating the pipeline stages of a CPU 10 in which the present invention is implemented. Specifically, during fetch stages 0 and 1, four instructions 12 are fetched per machine cycle from the instruction cache 14.

Mapping pipeline stage 2 assigns the virtual registers identified in the fetched instruction to physical registers maintained in the CPU 10. In the preferred embodiment, four instructions are renamed per cycle, assigning up to eight source and four destination registers. Further, there are eighty physical integer registers and seventy-two physical floating point registers. These mappings are performed in a separate integer register mapper 22 and a floating point register mapper 24.

Queue pipeline stage 3 issues instructions out-of-order when data is ready, i.e., when the registers containing the data are available. In the preferred embodiment, there are twenty instruction rows in the integer queue 26 and fifteen instruction rows in the floating point queue 28. Four integer instructions issue per cycle, and up to two floating point instructions issue per cycle.

Instructions leave the queues after they issue and the empty rows are marked as invalid. Valid flags or indicators are maintained in valid indicator storage locations. A valid indicator storage location is associated with each queue row.

In register pipeline stage 4, dual integer register files 30, 32 pass the data required by the issued instructions to four integer execution units 34–40. In a similar fashion, floating point register file 42 passes the required data for the floating point instructions to floating point divide/squareroot unit 44 and floating point multiply unit 46.

Two of the integer execution units 36, 40 have the capability to issue addresses to data cache 48, enabling two load/stores per cycle. The data cache 48 communicates off-chip via the bus interface 50.

Figure 2:
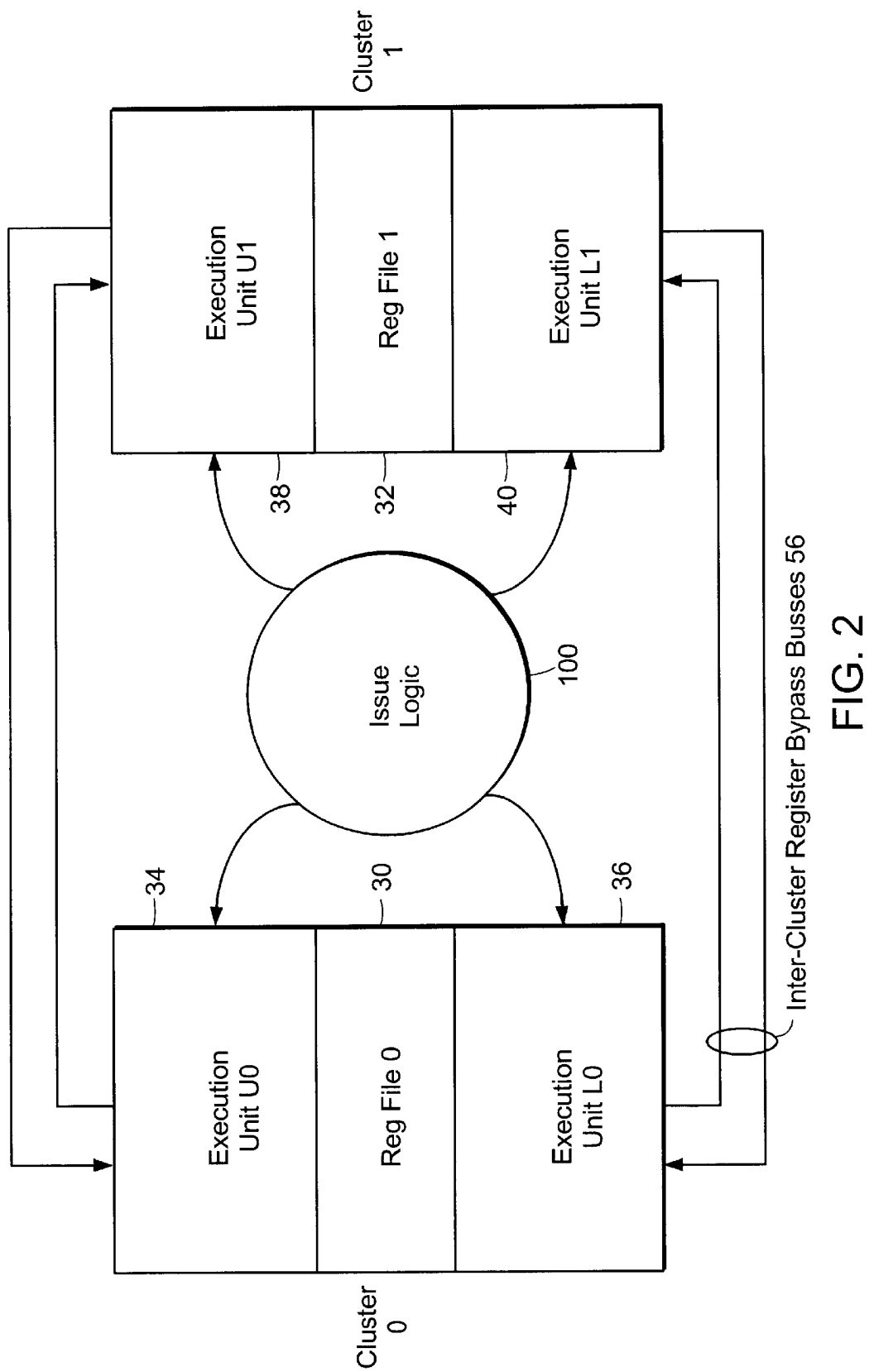
FIG. 2 is a block diagram showing the relationship between the issue logic, update logic, and execution units of the CPU.

FIG. 2 shows the general layout for integer execution. Four integer execution units 34–40 are arranged in two clusters, Cluster 0 and Cluster 1. Each cluster contains a complete copy of the register file: register file 0 30 and register file 1 32. The physical distance between the clusters requires that one cycle of latency exist between the conclusion of an operation in one cluster and the availability of the destination register in the other cluster. Register result data crosses between the clusters in intercluster register bypass buses 56.

The issue logic 100 schedules instructions to minimize the inter-cluster latency. The instructions are statistically assigned to request either the upper or lower pairs of execution units. This allows the instructions to have an opportunity to issue on the same cluster that produces the dependent register.

Figure 3:
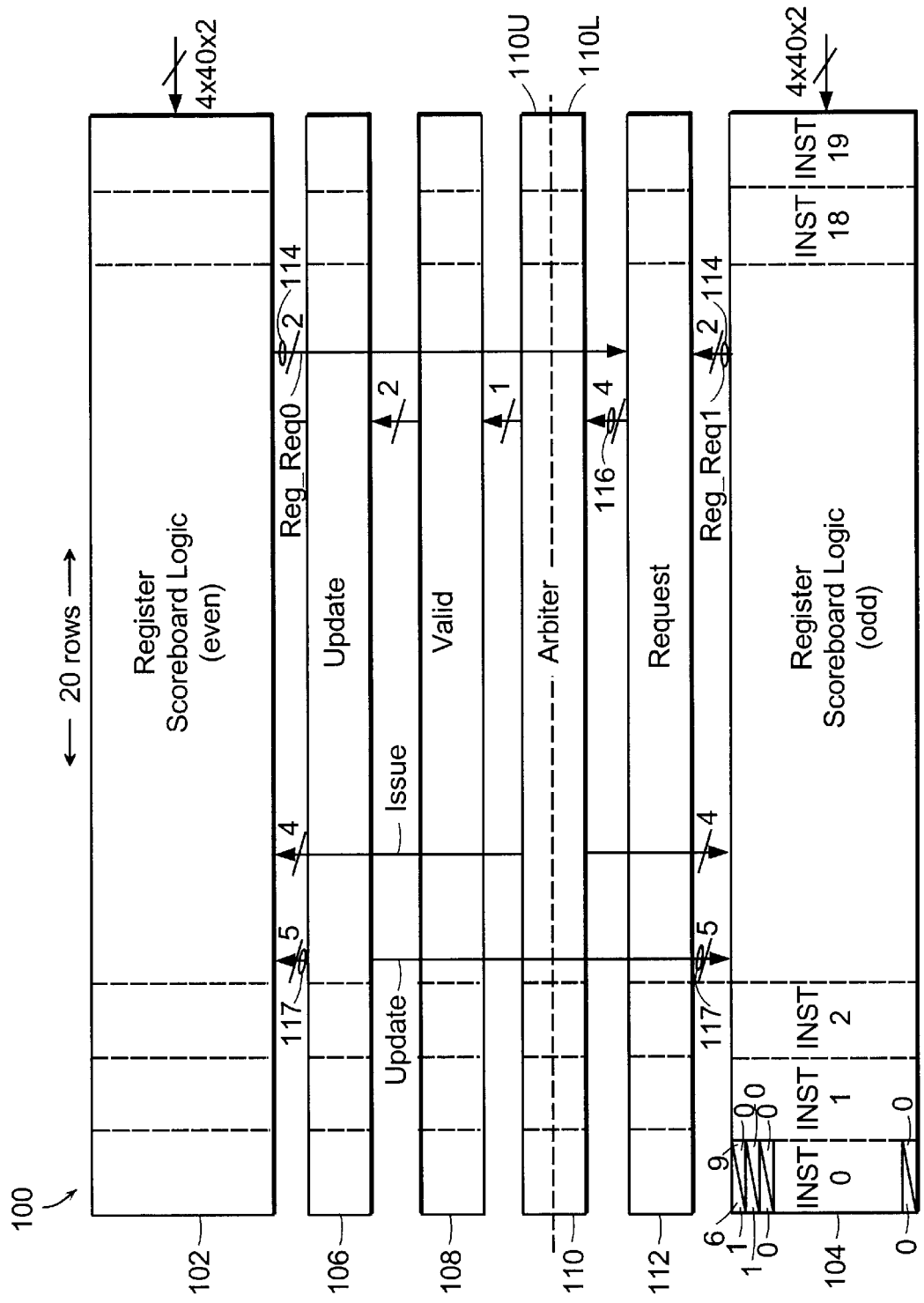
FIG. 3 is a block diagram describing the organization of the issue logic.

FIG. 3 shows the issue logic data path for the instruction queue. It contains twenty rows, one instruction occupying each row. The instructions are ordered from the oldest, INST0, at the bottom to the newest, INST19, in row 19, at the top. Up to four instructions enter the instruction queue per cycle, requiring compaction of the instructions remaining in the queue toward the bottom every cycle.

Register scoreboard logic is divided in halves 102, 104 book-ending the update 106, valid 108, arbiter 110, and request logic 112. Register scoreboard logic 102 holds the forty even registers and register scoreboard logic 104 holds the odd registers of the eighty integer physical registers, in the preferred embodiment.

For every instruction and each potential register required by the instructions, the register scoreboard logic holds two decoded fields (see fields a, b in register score board logic 104 at instruction INST0). The lower field is the decoded source register, and the upper field is the decoded destination register. Each cycle, the source field is compared to outstanding destination register numbers and a match signal is generated on one of two register request wires 114 running across the data path.

The request logic 112 stores execution unit assignment information. Each of the execution units 34–40 may execute different instructions or may or may not have access to the data cache 48. The request logic combines the execution assignment information with the two register request signals 114. The output is a four bit field 116 that indicates the execution units requested to the arbiter 110 by each row/ instruction.

The arbiter 110 contains two pick-oldest-two arbiter circuits operating in parallel to choose up to four instructions each cycle for execution.

The valid logic 108 maintains a valid bit for each row and pulls one of the request lines when invalid. It calculates a new valid bit each cycle based on issue, invalidate, and reset information.

Finally, the update logic 106 accepts five new valid bits each cycle and generates five select signals 117 used to compact the instructions in the queues 102, 104.

Figure 4:
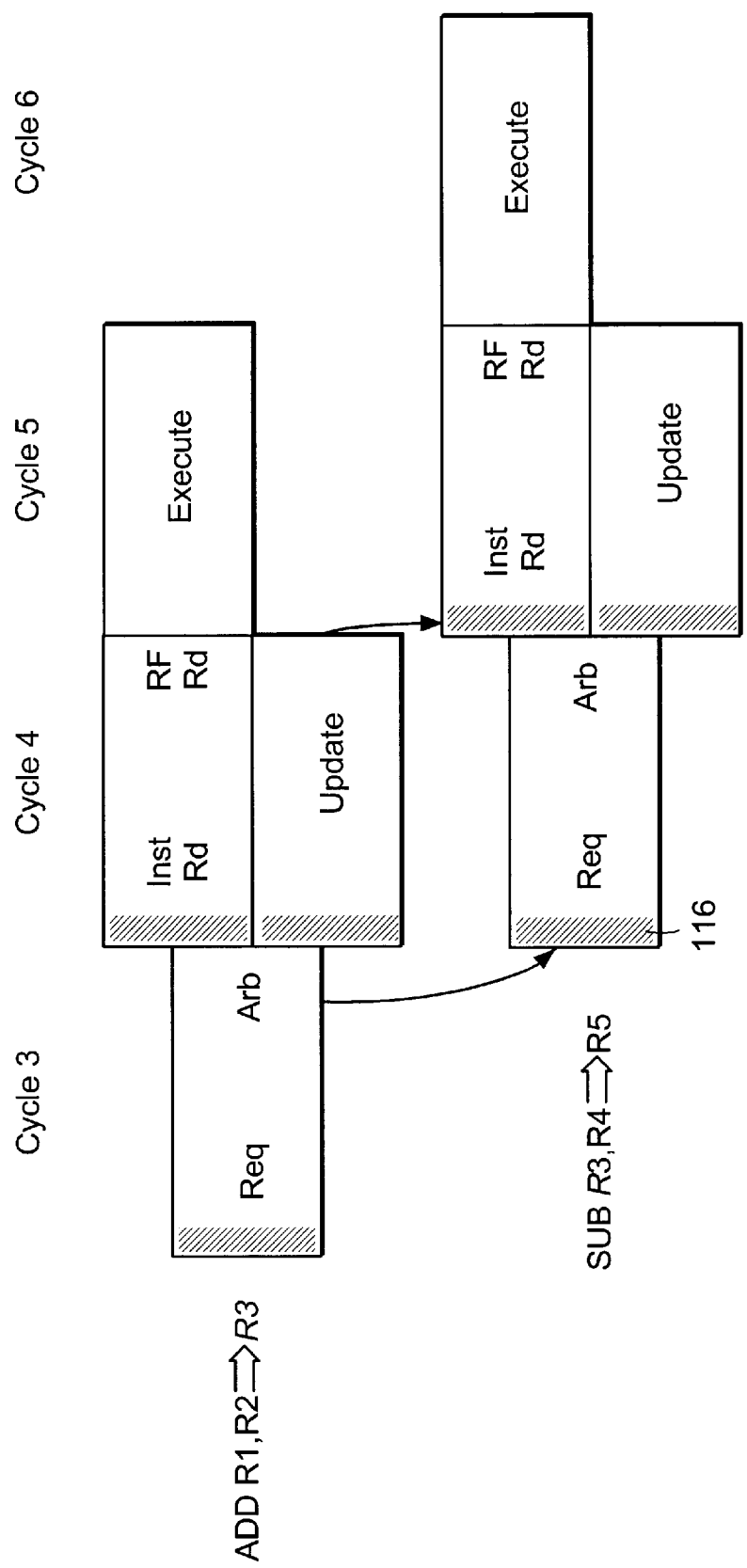
FIG. 4 is a timing diagram illustrating the register request, arbitration, scoreboard update, and instruction execution.

FIG. 4 is a timing diagram showing the progress of instructions from request to execution. In the illustrated example, ADD enters the queue, requests an execution unit, and wins the arbitration by the end of machine cycle 3, i.e., request and arbitration occur within one machine cycle. The issue signal is an index into the array with the instruction data enabling the instruction read in cycle 4. Passage of the instruction to the execution unit enables the register file read in the end of cycle 4 and the instruction execution in cycle 5.

Next, the SUB instruction can request to issue in cycle 4 since in the present invention, issuance of single cycle instructions makes available the corresponding registers for the next machine cycle. In this case, destination register R3 of ADD will be reflected as available in the scoreboard logic 102, 104 for the subsequent SUB, which uses R3 as the source register.

The issued instructions participate in the update calculation, which will overwrite that row in cycle 4 for the ADD and cycle 5 for the SUB, since in those cycles the corresponding instructions have exited the queue. This provides queue compaction at the beginning of each cycle as indicated by shaded region 116. The update logic calculates multiplexor select signals from valid states of the instructions in the queue and moves enough instructions to the bottom of the queue to free up to four rows at the top for newly fetched instructions.

Queue Compaction

Figure 5:
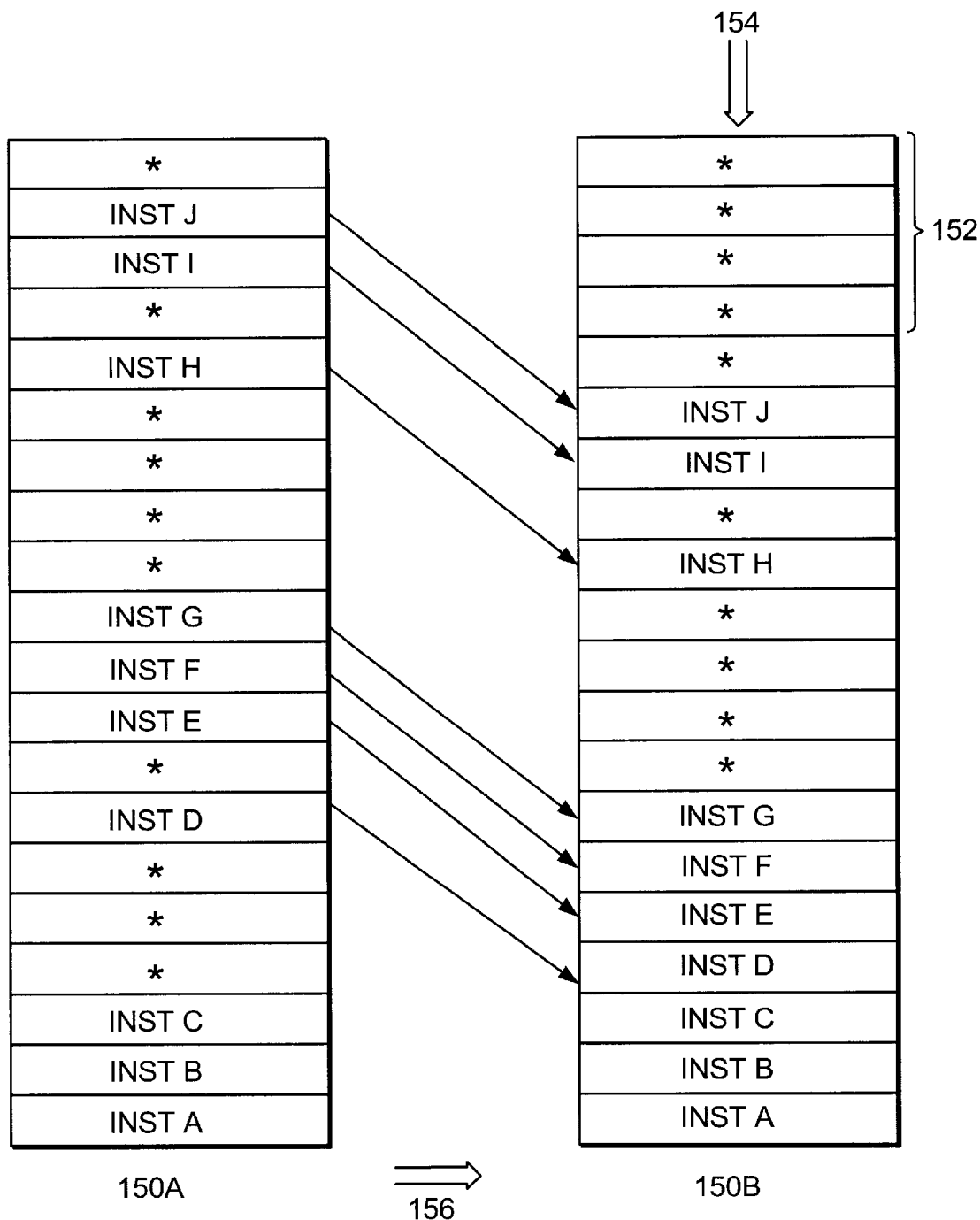
FIG. 5 is a schematic diagram illustrating the instruction queue compaction process of the present invention

FIG. 5 illustrates the instruction queue compaction process 156. For example, before compaction, the instruction queue 150A holds several valid instructions, INST A–INST J. Since instructions are issued out-of-order, removal of instructions from the queue leaves empty, or invalid, rows, indicated by asterisks (*), scattered throughout the queue 150A.

Each cycle, the remaining valid instructions INST A–INST J are physically compacted in the queue, toward the bottom, i.e., row 0, resulting in the queue as shown at 150B. In a preferred embodiment, compaction is simplified by moving instructions at most four rows each cycle. Because no more than four instructions enter the queue each cycle, the first four empty rows 152 will always be at the top of the queue. Thus, up to four new instructions are placed at the top of the queue, at 154, each cycle.

Figure 6:
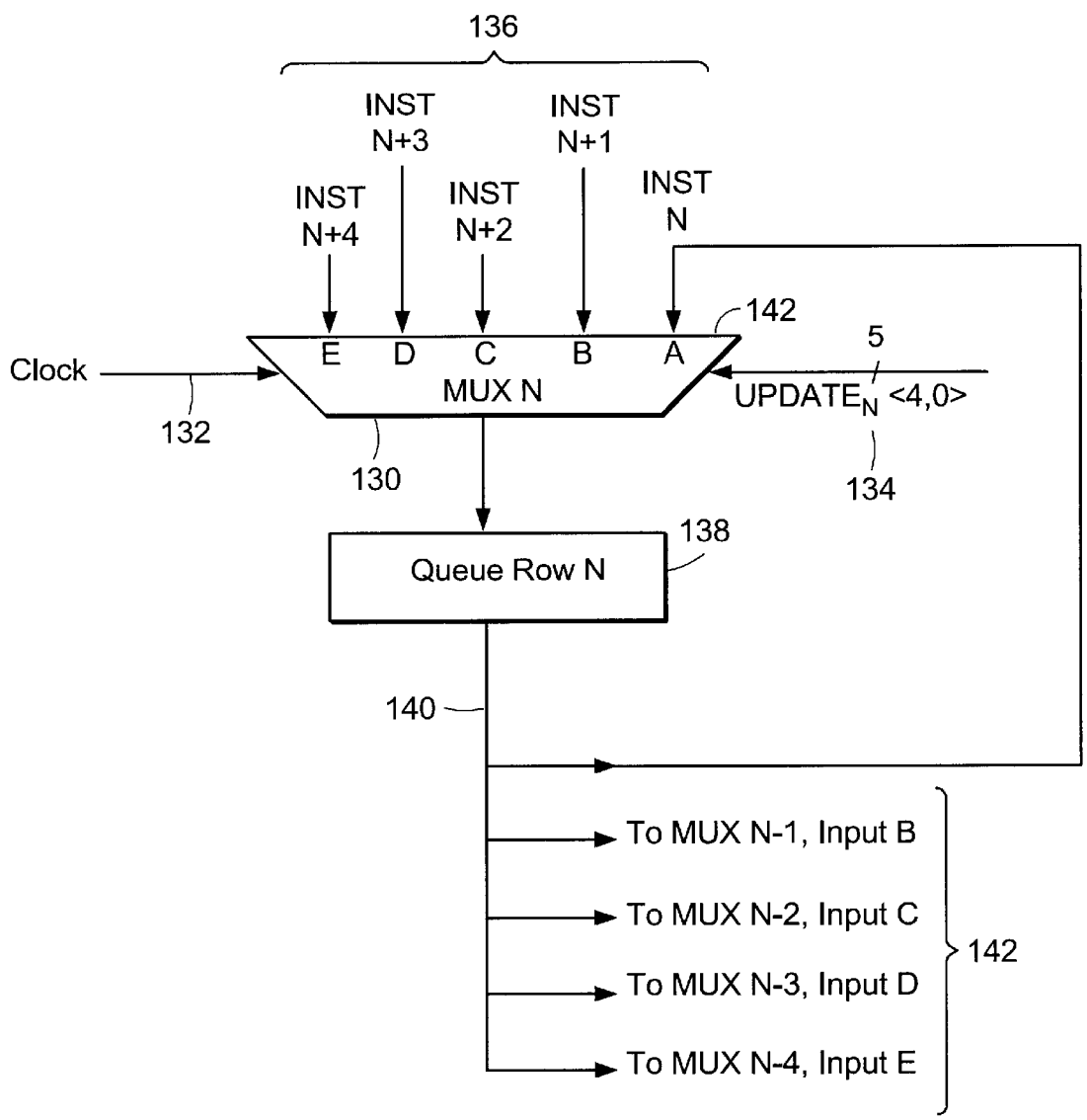
FIG. 6 is a schematic diagram illustrating one of the multiplexors which move instructions through the queue.

FIG. 6 illustrates one of the multiplexors 130 which move instructions through the queue. Preferably, one multiplexor is associated with each queue row. Here, queue row N 138 is shown with its associated multiplexor 130.

In the illustrated embodiment, each multiplexor has five data inputs 136. For row N, for example, these inputs 136 correspond to the instructions stored in rows N through N+4. One of the input instructions is selected by the multiplexor 130 and passed to queue row N 138. Five select signals UPDATE<4-0> 134, generated for each row by the update logic circuit 106 (FIG. 3), determine which of the five input instructions 136 will be moved to row N. For example, an instruction at row N+2 is moved two rows lower to row N by asserting the UPDATE<2> select signal to the multiplexor 130 for row N.

Note that each instruction stored in the queue forms an input to its own multiplexor as well as the multiplexors associated with the four rows immediately below. For example, the contents 140 of queue row N, is routed to multiplexors associated with rows N, N–1, N–2, N–3 and N–4, as shown at 142.

The update logic circuit 106 (FIG. 3) generates each row's multiplexor select signals to control the compaction of the queue. For each queue row, the update logic circuit counts the number of invalid rows from the bottom of the queue up to and including the instant row. This count saturates at four in the illustrated embodiment since instructions are shifted at most by four rows per cycle.

Figure 7:
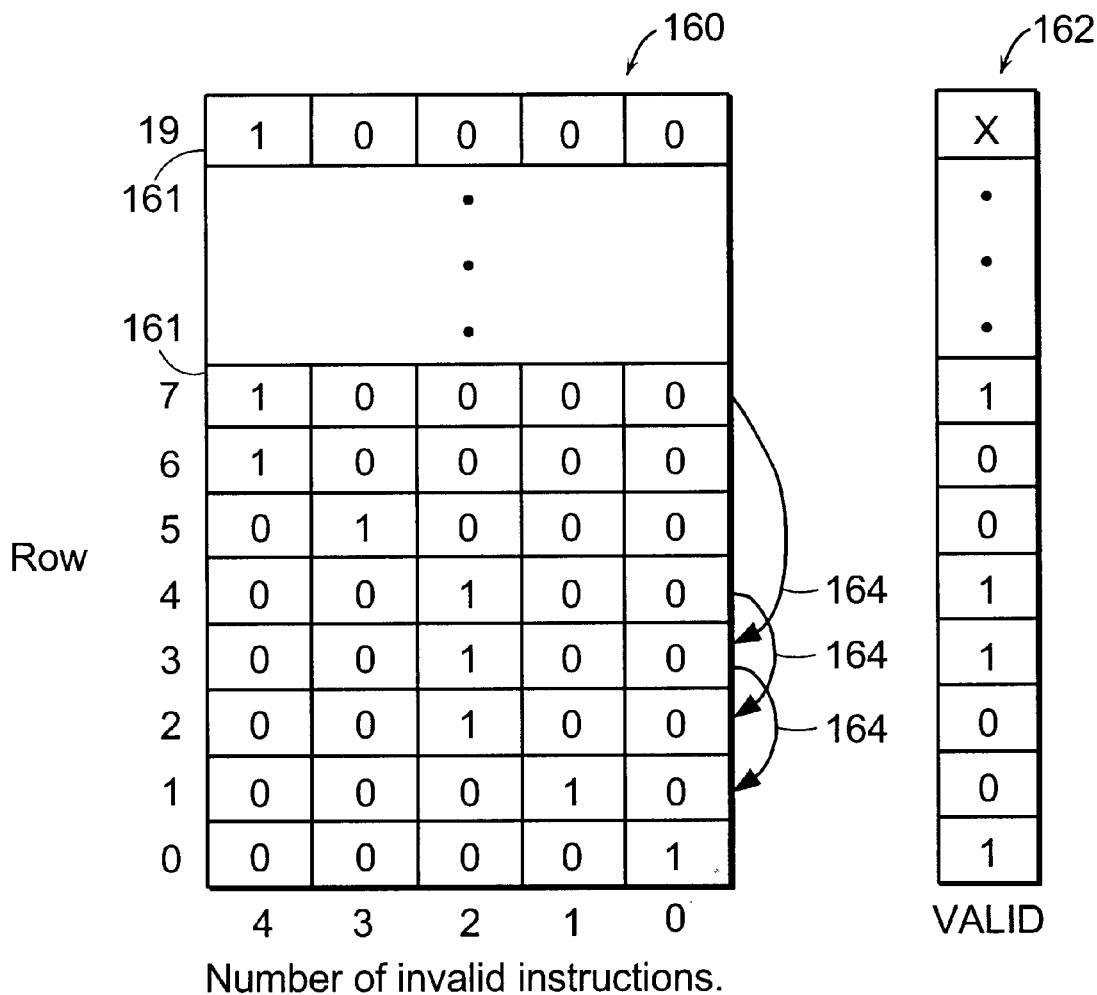
FIG. 7 is a schematic diagram illustrating the counters and valid bits associated with each queue row.

FIG. 7 illustrates the counters and valid bits associated with each queue row, where each counter is a flat vector. That is, for each row, five count bits are generated, only one of which is set at any time. Here, each counter 161 of counter block 160 is a vector counter associated with the corresponding queue row. In any counter, the position of the set bit indicates the number of invalid rows in the queue from that row to the bottom of the queue. Valid indicator storage locations 162 hold valid indicators associated with each queue row are also shown, a 1 here indicating a valid instruction in the corresponding queue row.

For example, row 0's valid indicator is 1, indicating that row 0 in the queue holds a valid instruction. Since there are no invalid instructions below, the bit corresponding to a count of 0 is set, and row 0's counter is <00001>.

Row 1 is empty, so the corresponding valid indicator is 0. Thus, there is one empty instruction up to and including row 1, so the bit corresponding to a count of 1 is set, yielding a counter value of <00010> for row 1.

As can be seen from rows 6 and up, the counters saturate at a value of 4, i.e., <10000>. As indicated by the arrows 164, each valid instruction is moved toward the bottom of the queue by the number of rows indicated by the corresponding counter.

Preferably, for each row in the queue, for example, row N, the update logic circuit 106 forms five multiplexor select signals, UPDATE<4:0> from counters 161 associated with rows N through N+4, and drives the select signals across the entire queue datapath at the start of each new cycle.

Figure 8:
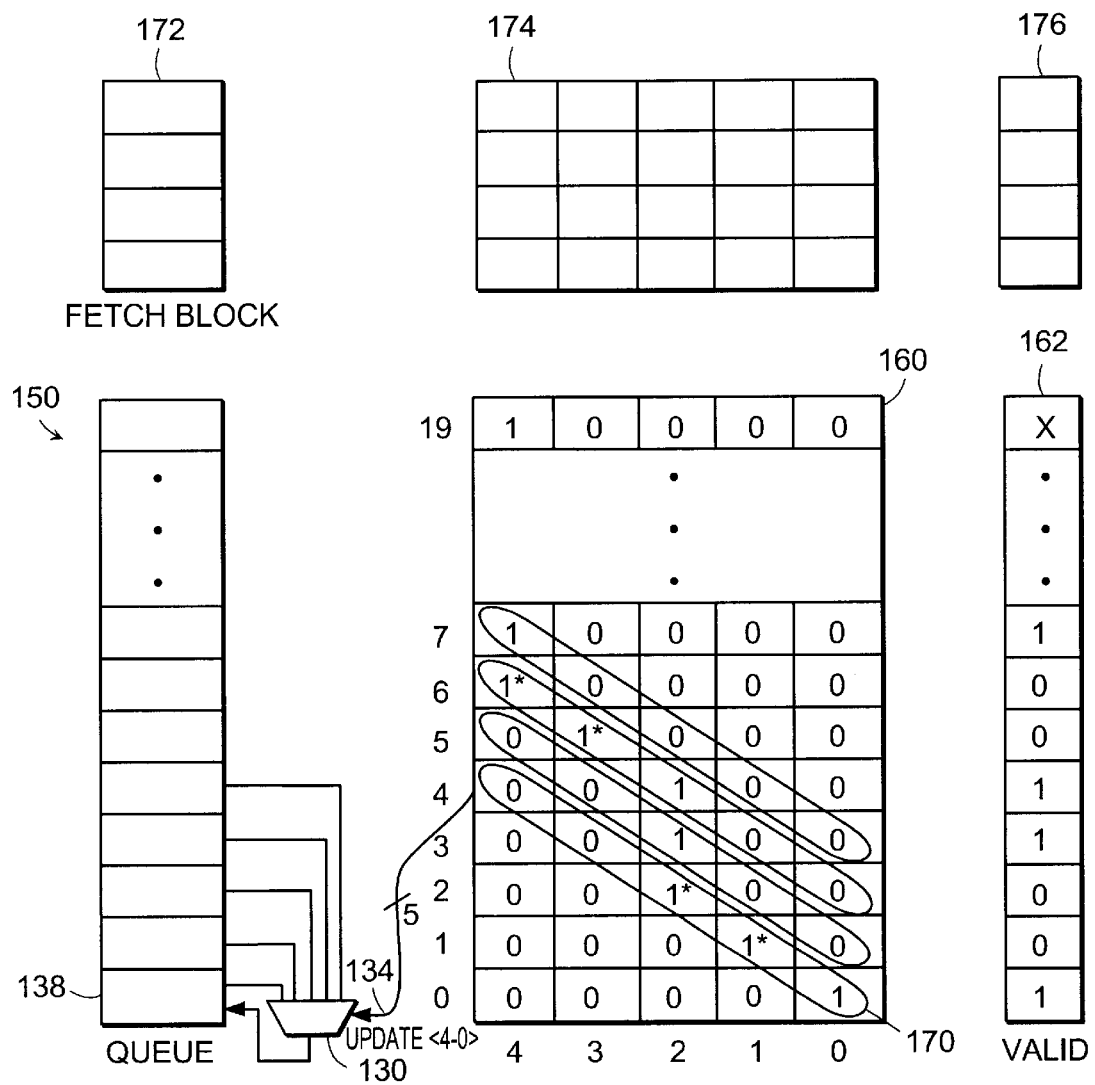
FIG. 8 is a schematic diagram illustrating a preferred method of generating the update signals from the counters.

FIG. 8 illustrates a preferred method of generating the update signals from the counters. For row 0, UPDATE<4:0> signals 134 are formed by combining the counter bits from rows 0 to 4 which lie in the diagonal 170, respectively. Each bit in the diagonal is logically ANDed with its row's valid bit to mask the count when the row contains an invalid instruction. Masked bits are indicated with asterisks (*). This has the effect of turning on only one UPDATE signal for each row when receiving a valid instruction, while shutting off all UPDATE signals for rows into which only invalid instructions would be shifted. This saves a large amount of power in the queue because invalid instructions are not moved within the queue. They are either overwritten with valid instructions or with the precharged value of the shift multiplexor 130.

Thus, for example, while the diagonal 170 corresponding to row 0 has the value <00111>, the masked UPDATE signals 134 which derive from the diagonal 170 ANDed with valid indicators for rows 0–4, or <11001>, are <00001>. This drives the multiplexor 130 to select the instruction stored in row 0. Thus the valid instruction in row 0 is not moved.

The update logic circuit 106 preferably extends beyond the queue to include four extra rows. These rows represent the four incoming instructions 172, which will enter the queue on the next cycle. Their valid bits 176 are counted and additional counters 174 are provided which affect the queue multiplexor select lines in the same manner as valid bits for instructions within the queue.

Figure 9:
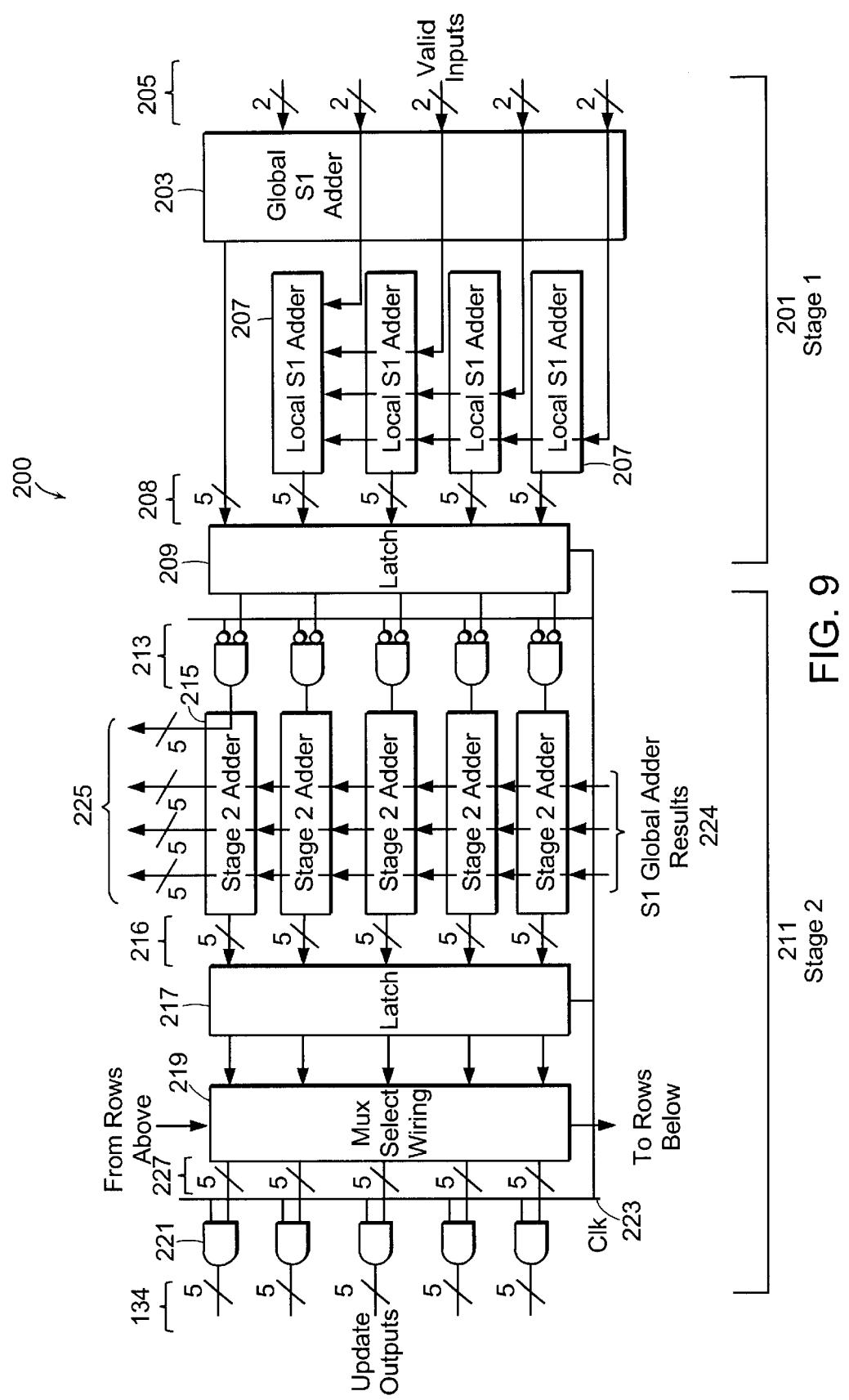
FIG. 9 is a block diagram of a preferred embodiment of the Update Logic circuit for five of the twenty queue rows.

As FIG. 9 illustrates, the update logic circuit 106 has one cycle of latency and consists of two stages, each taking one phase to complete. FIG. 9 illustrates a 5-row slice 200 of the 20-row update datapath. The structure of the datapath is similar to a carry lookahead adder, with the global adders performing the lookahead function.

Stage 1 201 counts instruction invalid bits up to and including each row and saturates at four. Stage 1 adders are broken into groups of five rows, as shown, to reduce their delay. Local adders 207 in four of the five rows sum the invalid bits in the complementary valid/invalid input pairs 205 within the group up to and including the designated row. A global adder 203 sums all five invalid bits within each group, similar to a lookahead adder. Local and global adder sums 208 are then driven into stage 2 211 through latch 209 and gates 213.

Stage 2 211 combines local and global sums 208 from stage 1 201 with Stage 1 global sums 224 from the groups below the instant group to form multiplexor selects 134 for each instruction queue row as described previously. The global sums from the groups below 224 and from the instant group are passed to the group above at 225.

The multiplexor select wiring 219 generates the update signals 227 from the diagonals of the counters as described above. The update signals 227 pass through gates 221 when enabled by clock signal 223, forming Stage 2 outputs 134. The Stage 2 outputs 134 are driven across the entire instruction queue, and control precharged NMOS pass transistor multiplexors to shift instructions within the queue.

Figure 10:
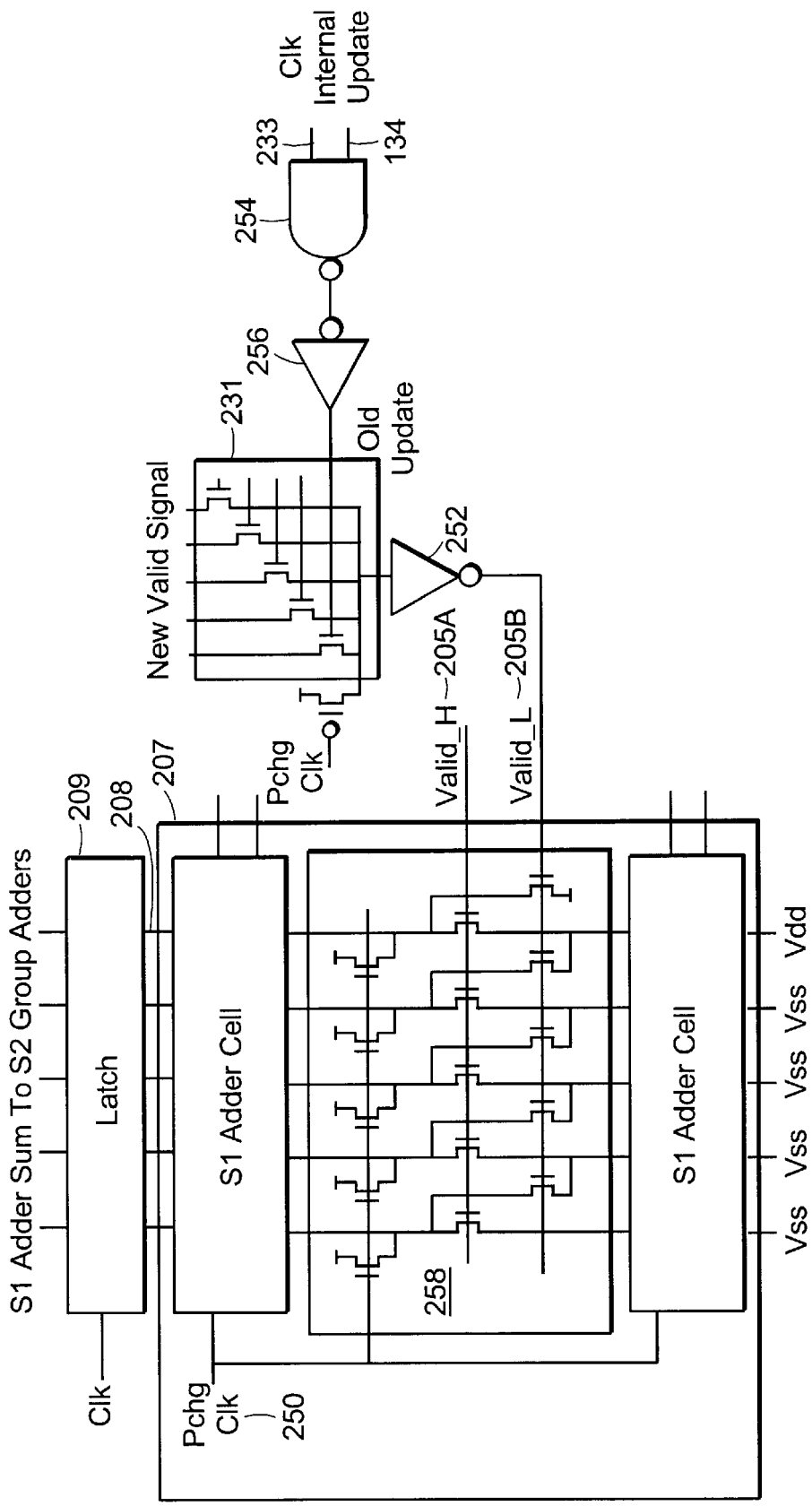
FIG. 10 is a schematic diagram of a simplified circuit of a local stage 1 adder circuit of FIG. 9.

FIG. 10 illustrates an update circuit Stage 1 adder 207 of FIG. 9 in detail.

Clock 233 has two phases, phase A and phase B. Each instruction's new valid bit is calculated from its issue signal during the clock's low assertion time, phase B. In phase A, or the high assertion time of clock 233, the valid bit is shifted into its new row through a precharged NMOS pass multiplexor 231, and dominoes into the stage 1 adder 207 using the old update multiplexor outputs 134, via gates 254 and 256. Note that complementary versions 205A, 205B of each row's valid bit are needed for the pass/shift function. The example of FIG. 10 has each of three rows drive into the stage 1 adder cells.

The adder 207 is implemented as a 5-bit precharged NMOS shifter array for fast addition, as illustrated by the center cell 258. The adder 207 adds by shifting a token left one bit for each valid entry. The five bits represent an invalid row count that saturates at four. The illustrated local adder 207 sums valid bits for three rows.

The stage 1 sum 208 is latched at 209 and driven to stage 2 in phase B. The update logic stage 2 output is turned into multiplexor selects as previously described and is driven across the issue logic datapath during the next phase A, which closes the loop.

As shown in FIG. 8, each rows' count bits are logically ANDed with that row's valid bit to mask the count when the row contains an invalid instruction. This has the effect of turning on only one UPDATE signal for each row when receiving a valid instruction, while shutting off all UPDATE signals for rows into which only invalid instructions would be shifted. This saves a large amount of power in the queue because invalid instructions are not moved within the queue: they are either overwritten with valid instructions or with the precharged value of the shift multiplexor.

However, in a preferred implementation, the two complementary valid bits associated with each instruction within the queue must be shifted properly and not dropped, even when that instruction is invalid, in order to guarantee correct results from the issue logic. These valid bits cannot simply receive the precharge value from the shift multiplexor when the row is invalid because that would destroy the information in those bits, which is needed.

Figure 11:
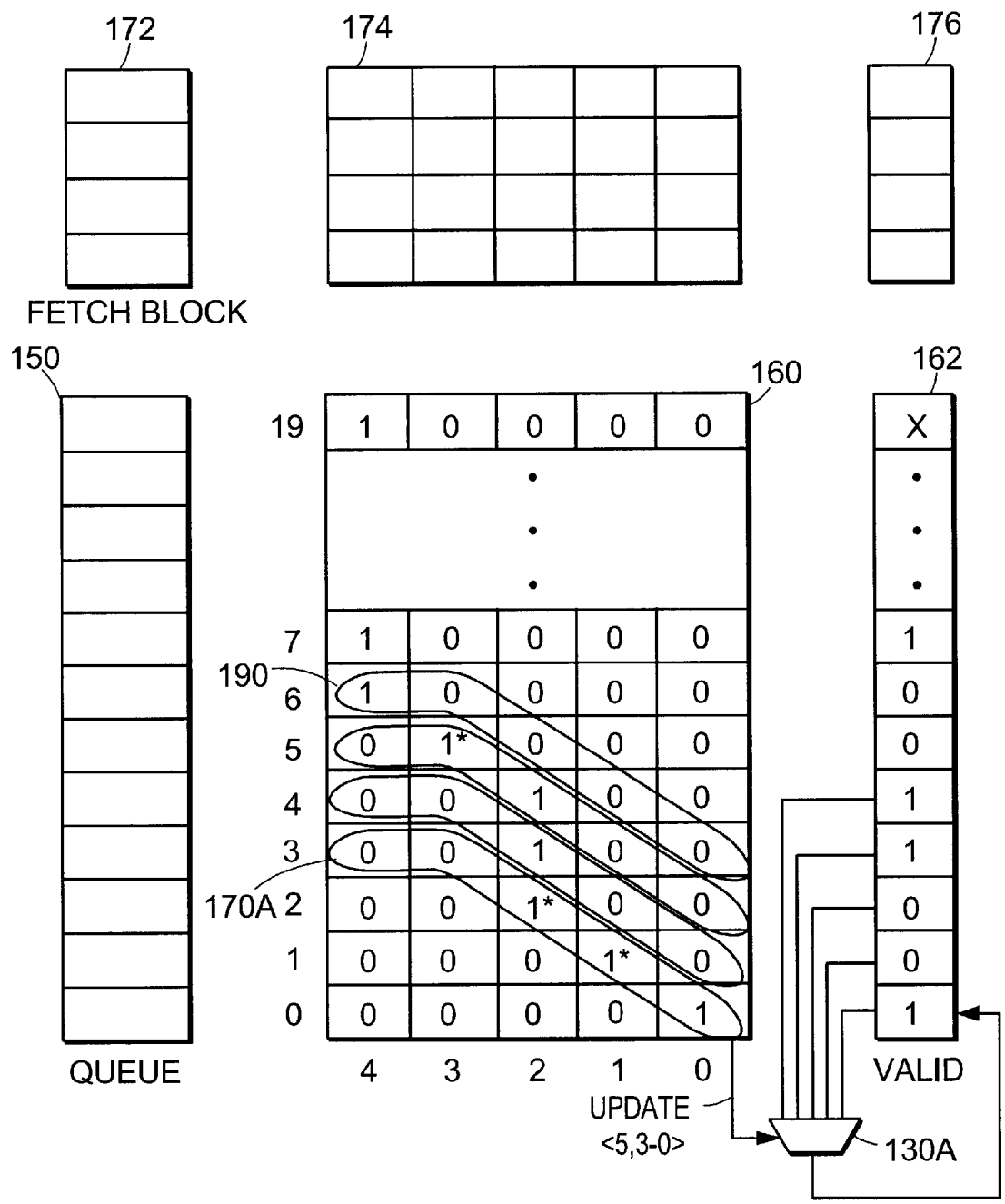
FIG. 11 is a schematic diagram illustrating a preferred implementation of generating update signals for the valid indicators.

FIG. 11 thus illustrates an implementation for generating update signals for shifting the valid indicators during compaction. A modified diagonal 170A is formed for each row. A second multiplexor 130A is associated with each queue row, using the same UPDATE<3-0> signals as the first multiplexor 130 (FIG. 8), but using an alternate select bit UPDATE<5> in place of UPDATE<4>. This alternate select UPDATE<5> is generated for each row N using the most significant bit, or count<4> wire, from row N+3, unmasked by the row's valid indicator.

This signal UPDATE<5> indicates that a count of 3 was found up to row N+3, and will become a count of 4 at row N+4 if row N+4 is invalid. If row N+4 is valid, the count stays at 3 and this bit will be off and does not conflict with UPDATE<3> which also comes from row N+3. This unmasked bit allows one UPDATE multiplexor select to remain on, thus selecting correct control values for these two bits even for invalid instructions.

Figure 12:
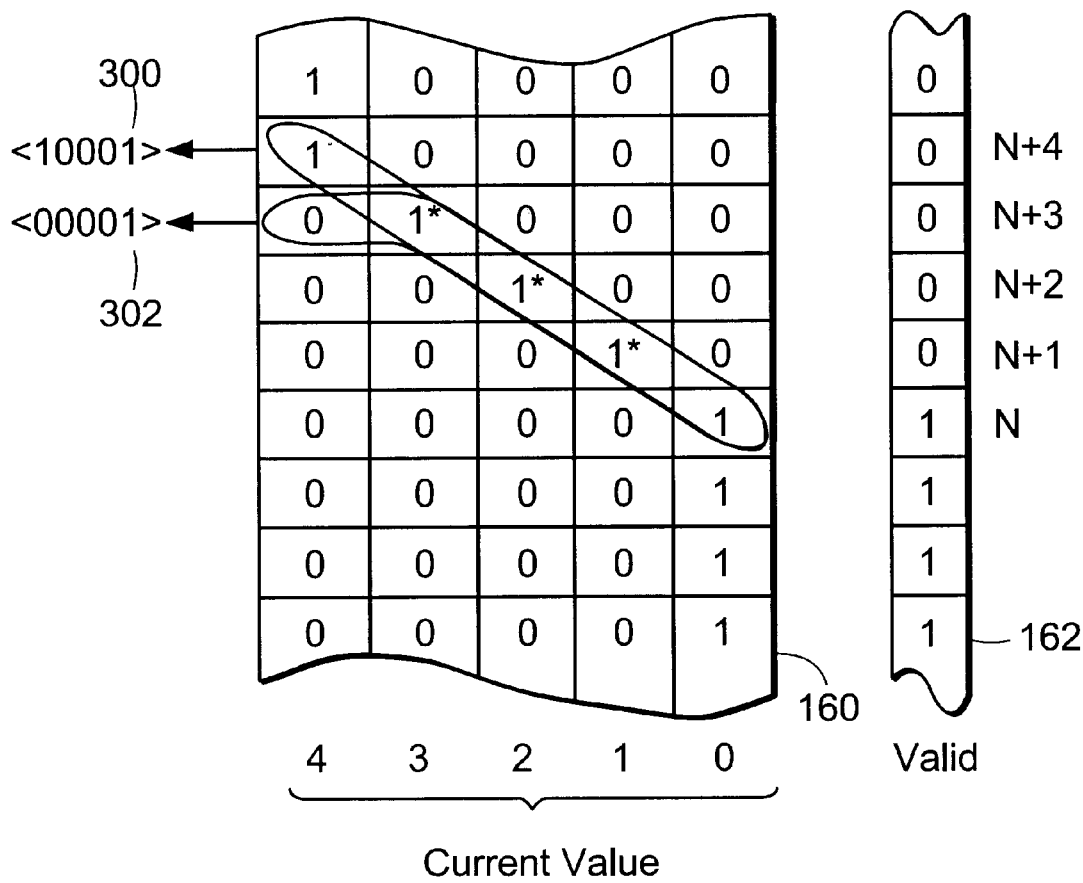
FIG. 12 is a schematic diagram illustrating a problem which the implementation shown in FIG. 11 resolves.

FIG. 12 illustrates why the unmasked UPDATE<5> bit is taken from row N+3 rather than row N+4. Assume that all rows up to and including row N hold valid instructions and that rows N+1 through N+4 do not hold valid instructions. If the unmasked UPDATE<5> signal were taken from row N+4, the count value would be <10001> 300, possibly causing improper overwriting of the valid indicator for row N. On the other hand, when the UPDATE<5> signal is taken from row N+3, as in a preferred embodiment, the resulting count 302 is <00001> and there is no conflict.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of compacting an instruction queue in a processor, the queue comprising a plurality of rows for holding instructions and associated validity indicators, in which instructions may be removed from the queue out of sequence, the method comprising:

for each row in the queue, responsive to validity indicators associated with rows below and including said row, determining a flat vector count of the number of invalid instructions below and including said row;

determining a select value, by
　　forming a diagonal from N counts corresponding to N rows above and including the present row, for a predetermined value N, wherein N is a maximum of new instructions which can enter the queue during any given cycle,
　　limiting each count to N, and
　　logically ANDing each diagonal bit with a set of validity indicators to form the present row's select value, each ANDed diagonal bit and corresponding validity indicator being associated with a common row, selecting one of the N rows responsive to the select value, and moving an instruction held in the selected row to the present row; and further comprising, for each row:
　　determining a modified select value, responsive to counts for the N−1 rows above and including the present row, and responsive to the validity indicators associated with the N−1 rows, by
　　　　forming a modified diagonal from the N−1 counts corresponding to the N−1 rows above and including the present row, and
　　　　logically ANDing each diagonal bit, except for a most significant diagonal bit, with a set of validity indicators to form the present row's modified select value, each ANDed diagonal bit and validity indicator being associated with a common row;
　　selecting one of the N rows responsive to the modified select value; and moving a validity indicator held in the selected row to the present row.

2. The method of claim 1, wherein:

determining a count is performed in two stages,
　　a first stage, in which a local count for each row in a local group of rows, and a global count for the entire local group, responsive to the set of validity indicators associated with rows in the local group, are made, and
　　a second stage, in which a count for each row in the queue, responsive to the local and global counts generated for the local group in the first stage, and to global counts generated in local groups below the local group, is made.

* * * * *